(12) United States Patent
Kim et al.

(10) Patent No.: US 12,473,013 B2
(45) Date of Patent: Nov. 18, 2025

(54) STEERING FORCE ACTUATOR

(71) Applicant: HYUNDAI MOBIS CO., LTD., Seoul (KR)

(72) Inventors: Il Ryong Kim, Yongin-si (KR); Jae Won Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/033,035

(22) Filed: Jan. 21, 2025

(65) Prior Publication Data

US 2025/0319923 A1 Oct. 16, 2025

(30) Foreign Application Priority Data

Apr. 12, 2024 (KR) .......................... 10-2024-0049385

(51) Int. Cl.
*F16H 1/28* (2006.01)
*B62D 5/00* (2006.01)
*F16H 57/08* (2006.01)

(52) U.S. Cl.
CPC ........... *B62D 5/006* (2013.01); *F16H 1/2863* (2013.01); *F16H 57/082* (2013.01)

(58) Field of Classification Search
CPC ...... B62D 5/006; F16H 1/2863; F16H 57/082
See application file for complete search history.

(56) References Cited

U.S. PATENT DOCUMENTS

| | | | | |
|---|---|---|---|---|
| 3,943,780 | A | * | 3/1976 | Klaue ................... F16H 1/2836 475/322 |
| 4,524,643 | A | * | 6/1985 | Ziegler .................. F16H 57/12 74/462 |
| 4,765,425 | A | * | 8/1988 | Saito ..................... B62D 5/0436 180/444 |
| 2003/0116376 | A1 | * | 6/2003 | Uryu .................... B62D 5/0415 180/446 |
| 2014/0352465 | A1 | * | 12/2014 | Chae ..................... F16H 1/2836 74/30 |

FOREIGN PATENT DOCUMENTS

| | | | | |
|---|---|---|---|---|
| JP | 2006264411 | A | * | 10/2006 |
| KR | 10-0530034 | B1 | | 11/2005 |
| KR | 20090017923 | A | * | 2/2009 |
| WO | WO-8501334 | A | * | 3/1985 ........... F16H 1/2836 |

* cited by examiner

*Primary Examiner* — Justin Holmes
(74) *Attorney, Agent, or Firm* — Morgan, Lewis & Bockius LLP

(57) ABSTRACT

A steering force actuator includes: a housing; a motor mounted in the housing and configured to provide a rotational force; a sun gear rotating by the motor; a ring gear mounted in the housing and disposed to surround the sun gear; a carrier rotating by meshing between the sun gear and the ring gear, wherein a steering shaft interlocked with a steering wheel is mounted on the carrier; and an elastic relaxation part mounted on the carrier to reduce backlash.

13 Claims, 9 Drawing Sheets

STEERING FORCE ACTUATOR

CROSS-REFERENCE TO RELATED APPLICATION

This application claims priority from and the benefit under 35 USC § 119 of Korean Patent Application No. 10-2024-0049385, filed on Apr. 12, 2024, in the Korean Intellectual Property Office, the entire disclosure of which is incorporated by reference for all purposes.

BACKGROUND

Field

Exemplary embodiments of the present disclosure relate to a steering force actuator, and more particularly, to a steering force actuator which may improve a steering feel and reduce a gear transmission error and operating noise by minimizing backlash in a planetary gear.

Description of the Related Art

As technology for autonomous vehicles advances, steering systems are expected to transition from the EPS system to the steer-by-wire (SBW) system. The SBW system may easily change the steering gear ratio depending on the driving situation of vehicles, which may improve driving convenience and vehicle stability.

The SBW system is composed of a steering force actuator (SFA) and a road wheel actuator (RWA). The SFA provides a reaction force to a steering wheel to ensure that a driver experiences a steering feel when turning the steering wheel. The SFA includes a steering reaction force motor and a reducer. By disposing the steering reaction force motor and the reducer coaxially with a steering column, the SFA may reduce its installation space, and the steering wheel may be easily stored on a dashboard.

In a conventional planetary gear-type reducer applied to a conventional SFA, a distance between shafts is fixed and applying a clearance compensation device is challenging. In addition, compared to a conventional worm wheel reducer or belt reducer, implementing a steering feel is challenging due to a clearance caused by backlash between gears. Therefore, there is a need for improvement.

The related art of the present disclosure is disclosed in Korean Patent No. 10-0530034 (registered on Nov. 14, 2005 and entitled "STEERING REPULSIVE POWER CONTROL APPARATUS OF STEER-BY-WIRE SYSTEM WHICH CONTROLLING FOR REPULSIVE POWER TORQUE BY WIDTH ACCELERATION").

SUMMARY

An objective of the present disclosure is to provide a steering force actuator, which may improve a steering feel and reduce a gear transmission error and operating noise by minimizing backlash in a planetary gear.

A steering force actuator according to the present disclosure includes: a housing; a motor mounted in the housing and configured to provide a rotational force; a sun gear rotating by the motor; a ring gear mounted in the housing and disposed to surround the sun gear; a carrier rotating by meshing between the sun gear and the ring gear, wherein a steering shaft interlocked with a steering wheel is mounted on the carrier; and an elastic relaxation part mounted on the carrier to reduce backlash.

The sun gear may include: a sun shaft connected to the motor and rotating by being disposed coaxially with the steering shaft; and sun teeth formed on the sun shaft and meshing with the carrier.

The carrier may include: a carrier body connected to the steering shaft; a plurality of carrier pins penetrating the carrier body and supported on the elastic relaxation part; a planetary gear rotatably mounted on the carrier pin and configured to cause rotation of the carrier body by meshing with the sun gear and the ring gear; and a carrier fixer configured to fix the planetary gear to the carrier body.

A carrier hole may be formed on the carrier body such that the carrier pin penetrates the carrier body, and the elastic relaxation part inserted into the carrier hole may be configured to elastically support the carrier pin.

At least one of the carrier hole and the carrier pin may be provided with a rotation limiting part configured to limit axial rotation of the elastic relaxation part.

The elastic relaxation part may include: a first elastic portion contacting with an inner peripheral surface of the carrier hole; a second elastic portion contacting with an outer peripheral surface of the carrier pin; and a third elastic portion connecting the first elastic portion and the second elastic portion, wherein the first elastic portion and the second elastic portion are alternately disposed in a circumferential direction of the carrier pin.

Both ends of the elastic relaxation part may be spaced apart from each other.

Both ends of the elastic relaxation part may be disposed to come into close contact with the inner peripheral surface of the carrier hole or the outer peripheral surface of the carrier pin and face each other.

The elastic relaxation part may further include a fourth elastic portion configured to: connect both ends of the elastic relaxation part; and be contracted by an external force and restored when the external force is removed.

Both ends of the elastic relaxation part may correspond to a direction of a load applied to the carrier pin.

In the steering force actuator according to the present disclosure, the elastic relaxation part applied to the carrier is preloaded to elastically support the carrier pin provided in the carrier, thereby suppressing the occurrence of backlash and enabling even load transmission to the planetary gear. As a result, the occurrence of noise and vibration may be mitigated.

DETAILED DESCRIPTION

Hereinafter, a steering force actuator will be described with reference to the accompanying drawings through various exemplary embodiments. It should be considered that the thickness of each line or the size of each component in the drawings may be exaggeratedly illustrated for clarity and convenience of description. In addition, the terms as used herein are defined in consideration of functions thereof in the present disclosure, and these terms may change depending on a user or operator's intention or practice. Therefore, these terms should be defined based on the entirety of the disclosure set forth herein.

Figure 1:
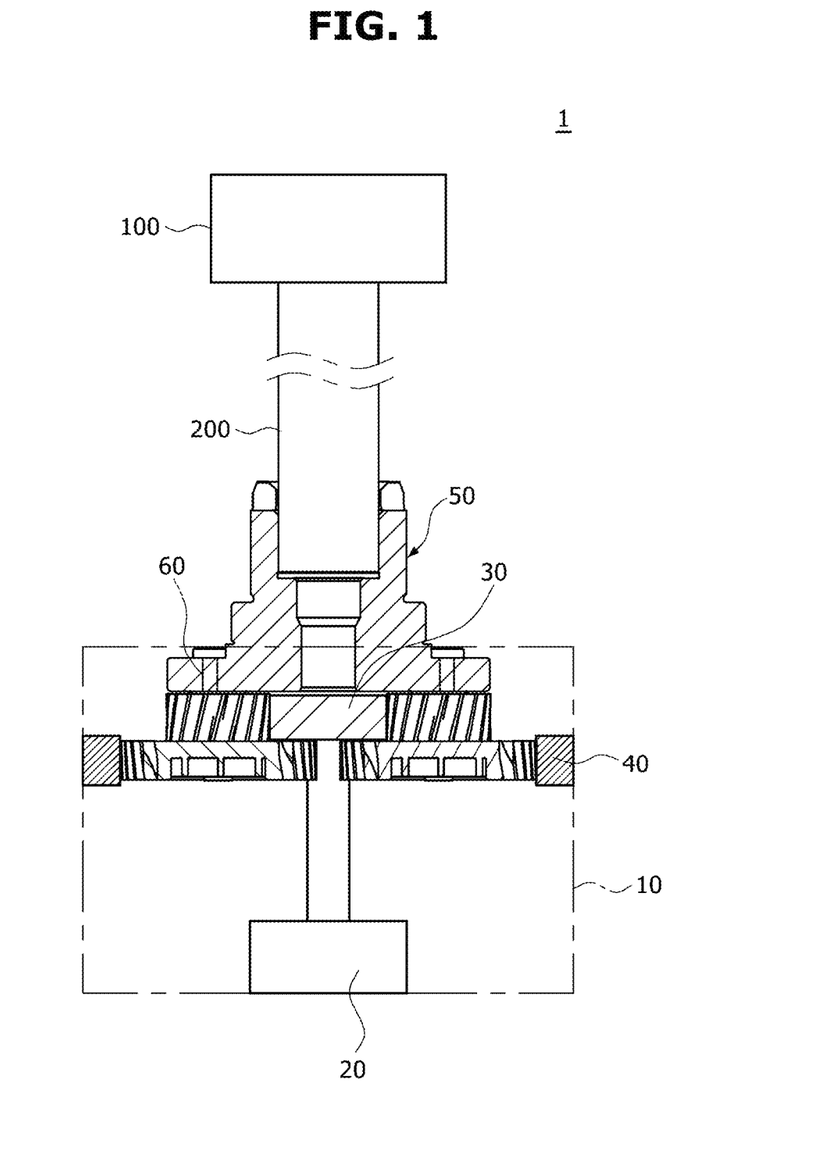
FIG. 1 is a view schematically illustrating a steering force actuator according to an embodiment of the present disclosure.

FIG. 1 is a view schematically illustrating a steering force actuator according to an embodiment of the present disclosure. Referring to FIG. 1, a steering force actuator 1 according to an embodiment of the present disclosure may include a housing 10, a motor 20, a sun gear 30, a ring gear 40, a carrier 50, and an elastic relaxation part 60.

The housing 10 may be mounted on a vehicle body. For example, the housing 10 may be disposed below a steering wheel 100, and may be fixedly installed on the vehicle body. A pair of the housings 10 may be assembled to cover internal components.

The motor 20 may be mounted in the housing 10, and may provide a rotational force. For example, the motor 20 may be driven in response to a signal from a sensor, configured to detect rotation of the steering wheel 100, and provide a reaction force to the steering wheel 100. The motor 20, configured to provide a rotational force when power is applied, may be implemented in various embodiments.

The sun gear 30 may rotate by the motor 20. For example, the sun gear 30 may rotate by being directly connected to the motor 20.

The ring gear 40 may be mounted in the housing 10 and disposed to surround the sun gear 30. For example, the ring gear 40 may be integrally formed on an inner wall of the housing 10, or may be fixedly installed in the housing 10. The ring gear 40 may be ring-shaped, and teeth may be formed along an inner peripheral surface thereof.

The carrier 50 may rotate by meshing between the sun gear 30 and the ring gear 40, and a steering shaft 200 interlocked with the steering wheel 100 may be mounted on the carrier 50. For example, the steering shaft 200 may be connected to the steering wheel 100 operated by a driver, and the steering shaft 200 may penetrate the housing 10 and be press-fit into the carrier 50. The steering shaft 200 may be disposed in line with a central axis of the sun gear 30.

The elastic relaxation part 60 may be mounted on the carrier 50 to reduce backlash. For example, the elastic relaxation part 60 may be made of a metal material, and may have an elastically deformable and resilient shape. The elastic relaxation part 60 may be contracted and restored depending on whether a load is applied to the carrier 50, thereby suppressing the occurrence of backlash. The elastic relaxation part 60 may provide preload to the carrier 50.

Figure 2:
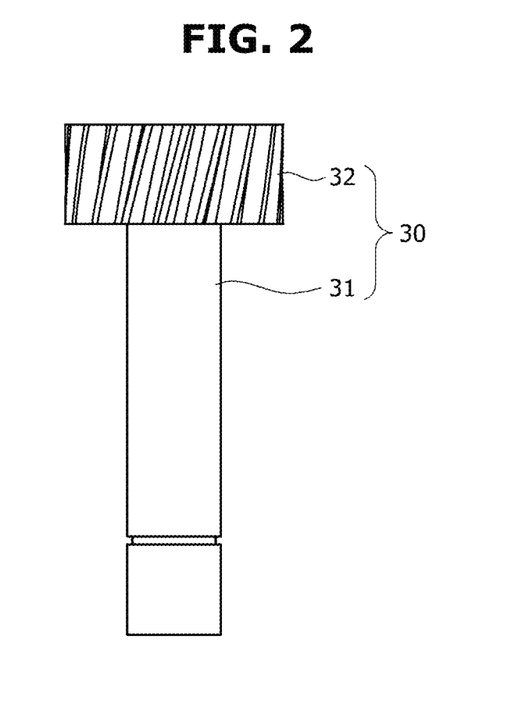
FIG. 2 is a view schematically illustrating a sun gear according to an embodiment of the present disclosure.

FIG. 2 is a view schematically illustrating a sun gear according to an embodiment of the present disclosure. Referring to FIG. 2, the sun gear 30 according to an embodiment of the present disclosure may include a sun shaft 31 and sun teeth 32.

The sun shaft 31 may be connected to a rotational shaft of the motor 20, and may rotate by being disposed coaxially with the steering shaft 200. For example, the sun shaft 31 may be inserted into the carrier 50.

The sun teeth 32 may be formed on the sun shaft 31, and may mesh with the carrier 50. For example, the sun teeth 32 may be a gear formed to surround the sun shaft 31. The sun teeth 32 may be press-fit into the sun shaft 31, or may be integrally formed with the sun shaft 31.

Figure 3:
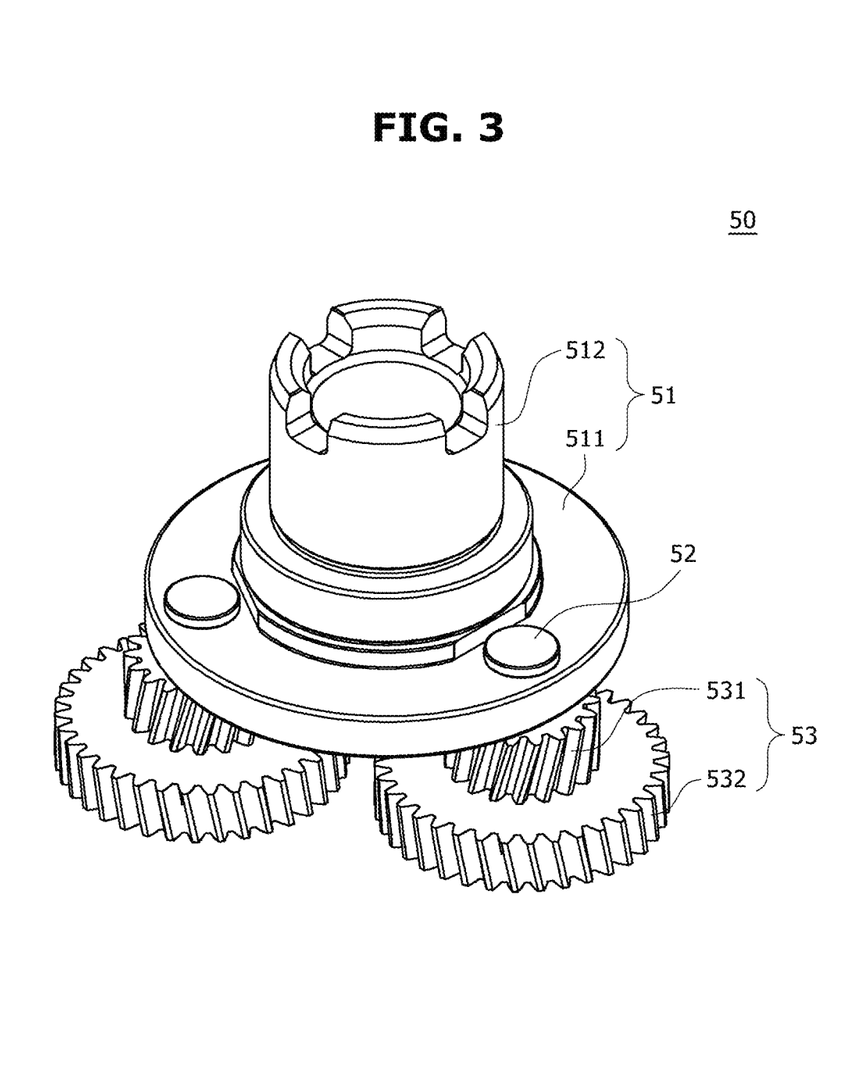
FIG. 3 is an assembled perspective view schematically illustrating a carrier according to an embodiment of the present disclosure.
Figure 4:
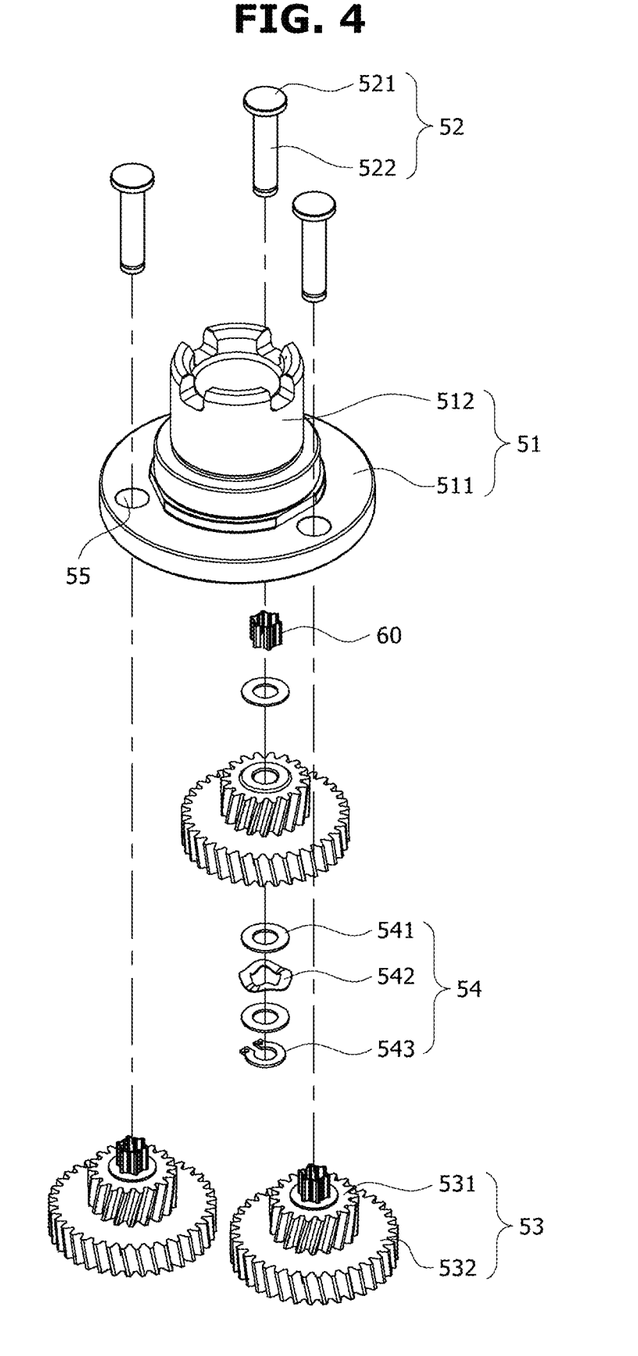
FIG. 4 is an exploded perspective view schematically illustrating the carrier according to an embodiment of the present disclosure.
Figure 5:
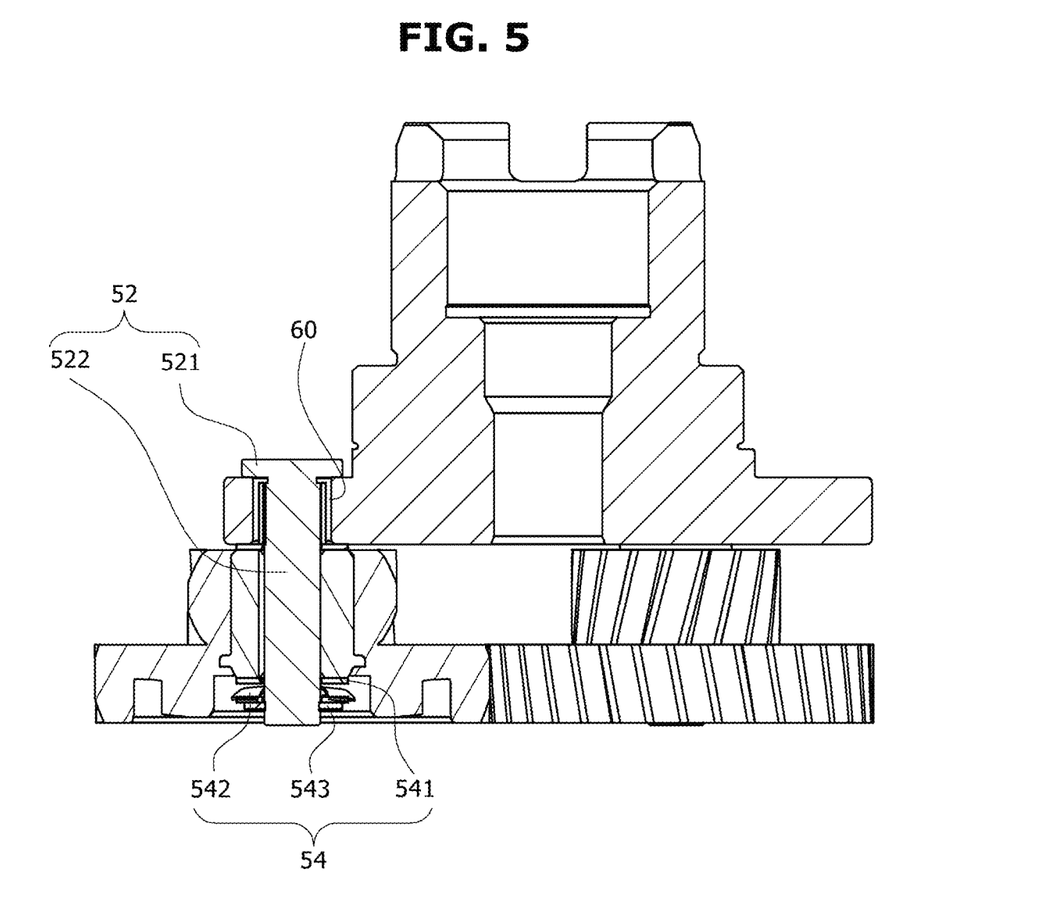
FIG. 5 is a cross-sectional view schematically illustrating the carrier according to an embodiment of the present disclosure.
Figure 6:
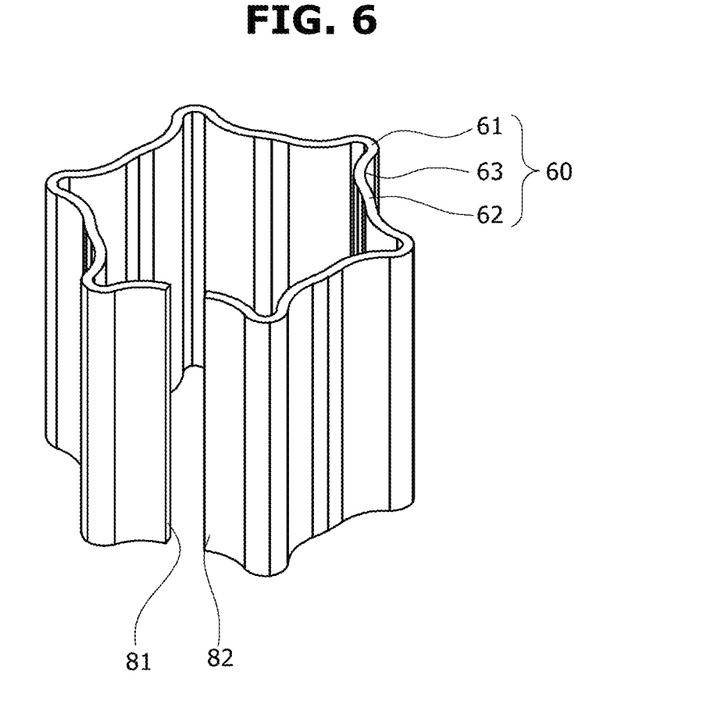
FIG. 6 is a view schematically illustrating an elastic relaxation part according to an embodiment of the present disclosure.
Figure 7:
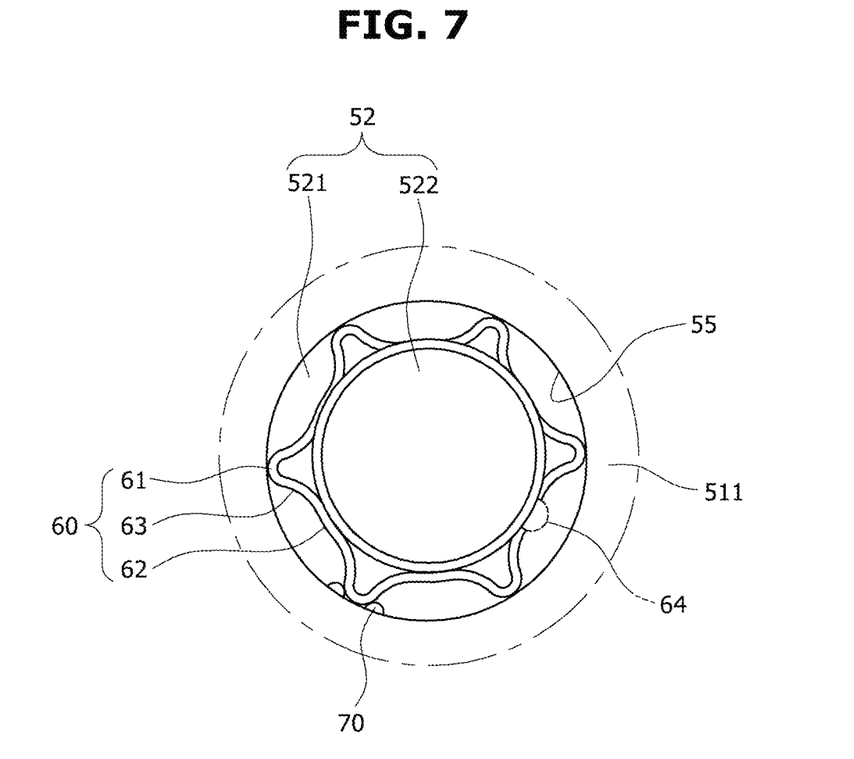
FIG. 7 is a view schematically illustrating the elastic relaxation part mounted on a carrier hole according to an embodiment of the present disclosure.
Figure 8:
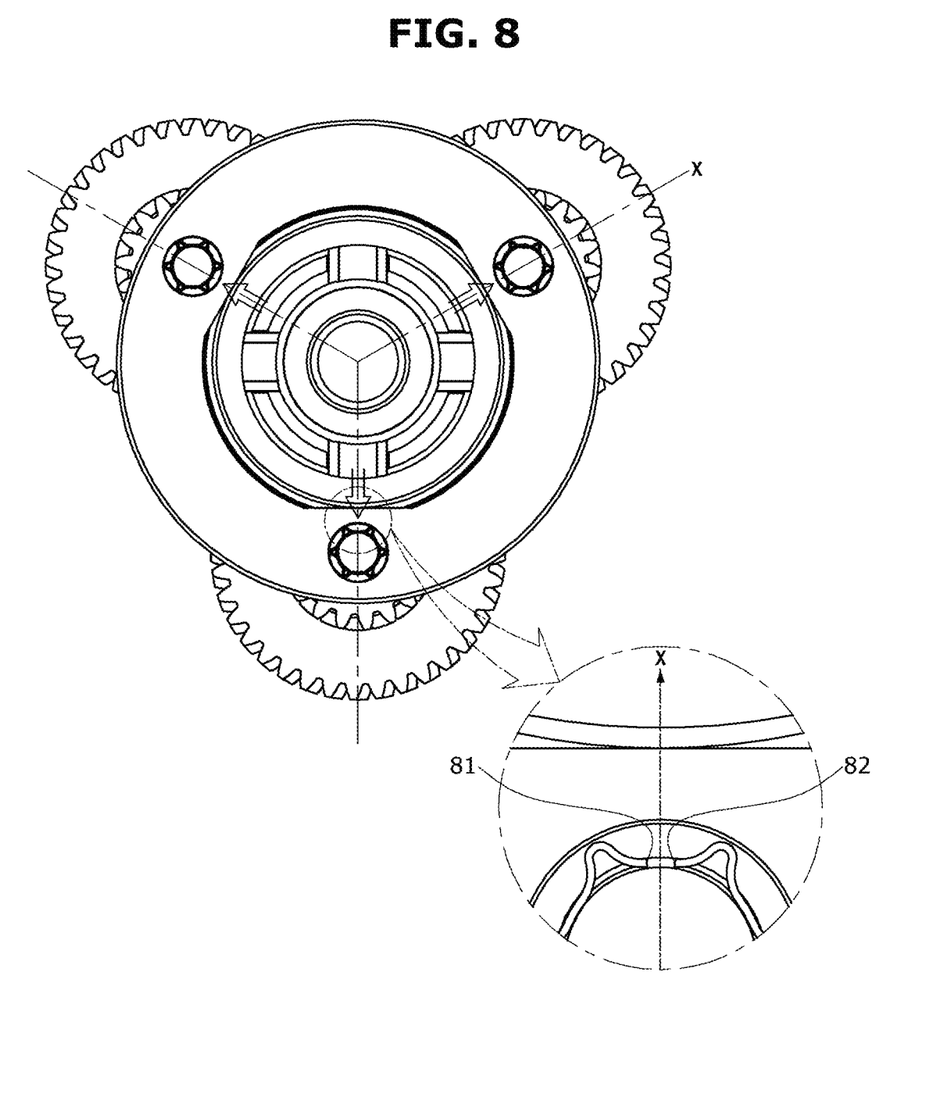
FIG. 8 is a view schematically illustrating an arrangement of the elastic relaxation part based on a load applied to the carrier according to an embodiment of the present disclosure.

FIG. 3 is an assembled perspective view schematically illustrating a carrier according to an embodiment of the present disclosure. FIG. 4 is an exploded perspective view schematically illustrating the carrier according to an embodiment of the present disclosure. FIG. 5 is a cross-sectional view schematically illustrating the carrier according to an embodiment of the present disclosure. FIG. 6 is a view schematically illustrating an elastic relaxation part according to an embodiment of the present disclosure. FIG. 7 is a view schematically illustrating the elastic relaxation part mounted on a carrier hole according to an embodiment of the present disclosure. FIG. 8 is a view schematically illustrating an arrangement of the elastic relaxation part based on a load applied to the carrier according to an embodiment of the present disclosure. Referring to FIGS. 3 to 8, the carrier 50 according to an embodiment of the present disclosure may include a carrier body 51, a carrier pin 52, a planetary gear 53, and a carrier fixer 54.

The carrier body 51 may be connected to the steering shaft 200. For example, the carrier body 51 may include a body plate 511 having a disk shape and a body connector 512 protruding from a center portion of the body plate 511 toward the steering shaft 200 and transmitting a rotational reaction force to the steering shaft 200. The body connector 512 may be exposed to the outside by penetrating the housing 10.

A plurality of the carrier pins 52 may penetrate the carrier body 51 and be supported on the elastic relaxation part 60. For example, the carrier pin 52 may include a pin engagement portion 521 seated on the body plate 511, and a pin rod 522 extending from the pin engagement portion 521 and penetrating the body plate 511.

The planetary gear 53 may be mounted on the carrier pin 52, and may cause rotation of the carrier body 51 by meshing with the sun gear 30 and the ring gear 40. For example, the planetary gear 53 may be formed in two stages, with teeth of different diameters. The planetary gear 53 may include a first gear 531 meshing with the sun teeth 32, and a second gear 532 having a larger diameter than the first gear 531 and meshing with the ring gear 40. The planetary gear 53 may mesh with the sun gear 30 and the ring gear 40, which are fixed in position, and rotate around the carrier pin 52 acting as a central axis, thereby causing rotation of the carrier body 51 itself.

The carrier fixer 54 may fix the planetary gear 53 to the carrier body 51. For example, the carrier fixer 54 may be mounted on the carrier pin 52 such that the carrier pin 52 remains mounted on the carrier body 51.

The carrier fixer 54 may include a fixing flat washer 541, a fixing elastic washer 542, and a fixing snap ring 543. The fixing flat washer 541 may be penetrated by the pin rod 522, and may have a shape with a flat cross-section. The fixing elastic washer 542 may be penetrated by the pin rod 522, and may have a shape with a wave-like curved cross-section. The fixing elastic washer 542 may be made of a highly elastic material such as spring steel. The fixing snap ring 543 may be mounted on the pin rod 522 to prevent the fixing flat washer 541 and the fixing elastic washer 542 from being dislodged.

The fixing elastic washer 542 may elastically pressurize the planetary gear 53 toward the carrier body 51. As a result, the planetary gear 53 may be brought into maximum contact with the carrier body 51, thereby minimizing a clearance.

In addition, the pin engagement portion 521 may be brought into maximum contact with the body plate 511 by an elastic force of the fixing elastic washer 542. Therefore, tilting may be prevented even though the planetary gear 53 is a so-called two-stage gear having the first gear 531 and the second gear 532 with different diameters.

A carrier hole 55 may be formed on the carrier body 51 such that the carrier pin 52 may penetrate the carrier body 51. For example, a plurality of the carrier holes 55 may be disposed to be spaced apart from each other in a circumferential direction of the carrier body 51. The plurality of the carrier holes 55 may be formed by penetrating the carrier body 51 in a thickness direction thereof. The plurality of the carrier holes 55 may be formed at equiangular intervals with respect to a central axis of the steering shaft 200, and may be formed to be spaced equal distances apart from each other. Three carrier holes 55 may be formed in the circumferential direction of the carrier body 51, and the planetary gears 53 may be mounted on the carrier pins 52 penetrating the carrier holes 55, respectively.

The elastic relaxation part 60 may be inserted into the carrier hole 55 to elastically support the carrier pin 52. For example, the pin engagement portion 521 may be designed to have a cross-sectional diameter larger than a hole diameter of the carrier hole 55. The pin rod 522 may be designed to have a cross-sectional diameter smaller than a hole diameter of the carrier hole 55. As a result, a space may be formed between the pin rod 522 and the carrier hole 55, and the elastic relaxation part 60 may be inserted into the space to provide preload to the pin rod 522.

At least one of the carrier hole 55 and the carrier pin 52 may be provided with a rotation limiting part 70 configured to limit axial rotation of the elastic relaxation part 60. For example, the rotation limiting part 70 may protrude from an inner peripheral surface of the carrier hole 55 to limit rotation of the carrier pin 52. In addition, the rotation limiting portion 70 may extend from the carrier pin 52 and be inserted into a recessed area of the inner peripheral surface of the carrier hole 55. In addition, the elastic relaxation part 60 may be designed such that appropriate preload is formed on the elastic relaxation part 60 itself during an initial assembly.

The elastic relaxation part 60 according to an embodiment of the present disclosure may include a first elastic portion 61, a second elastic portion 62, and a third elastic portion 63. The first elastic portion 61 to the third elastic portion 63 may be integrally formed in a circumferential direction. The elastic relaxation part 60 may be made of an elastic material such as a spring.

The first elastic portion 61 comes into close contact with the inner peripheral surface of the carrier hole 55, the second elastic portion 62 comes into close contact with an outer peripheral surface of the carrier pin 52, and the third elastic portion 63 may connect the first elastic portion 61 and the second elastic portion 62. The first elastic portion 61 and the second elastic portion 62 may be alternately disposed in the circumferential direction. For example, the first elastic portion 61 may have a curved shape to come into point contact or surface contact with the inner peripheral surface of the carrier hole 55. The second elastic portion 62 may have a curved shape to come into point contact or surface contact with the outer peripheral surface of the carrier pin 52. At least two first elastic portions 61 and at least two second elastic portions 62 may be formed at equal intervals in the circumferential direction, respectively.

Both ends of the elastic relaxation part 60 may be spaced apart from each other. For example, the elastic relaxation part 60 may form a closed section to form a partially cut surface, or may be molded, in a mold, to have both ends spaced apart from each other.

Both ends of the elastic relaxation part 60 may be disposed to come into close contact with the inner peripheral surface of the carrier hole 55 or the outer peripheral surface of the carrier pin 52 and face each other. For example, a first end 81 and a second end 82 may each be disposed to come into close contact with the outer peripheral surface of the carrier pin 52 and face each other.

The elastic relaxation part 60 may further include a fourth elastic portion 64. The fourth elastic portion 64 may connect both ends of the elastic relaxation part 60. The fourth elastic portion 64 may be contracted by an external force and restored when the external force is removed. For example, the fourth elastic portion 64 may further connect the first end 81 and the second end 82, and may be deformed when the first end 81 and the second end 82 are brought closer to each other by an external force. In addition, when the external force is removed, additional resilience may be provided to return the first end 81 and the second end 82 to the original position thereof.

Both ends of the elastic relaxation part 60 may correspond to a direction of the load applied to the carrier pin 52. For example, three carrier pins 52 may be disposed at 120-degree intervals on the carrier body 51, and an imaginary line x extending from the carrier body 51 to the carrier pin 52 may be disposed to pass between the first end 81 and the second end 82.

Figure 9A:
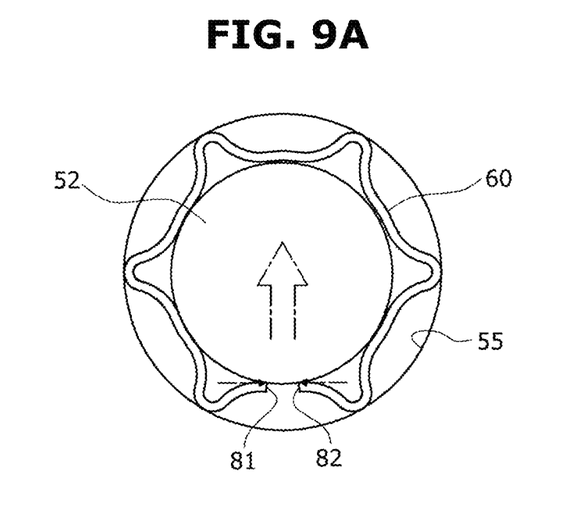
FIGS. 9A and 9B are a view schematically illustrating both ends of the elastic relaxation part and the movement of the elastic relaxation part based on a load direction according to an embodiment of the present disclosure.
Figure 9B:
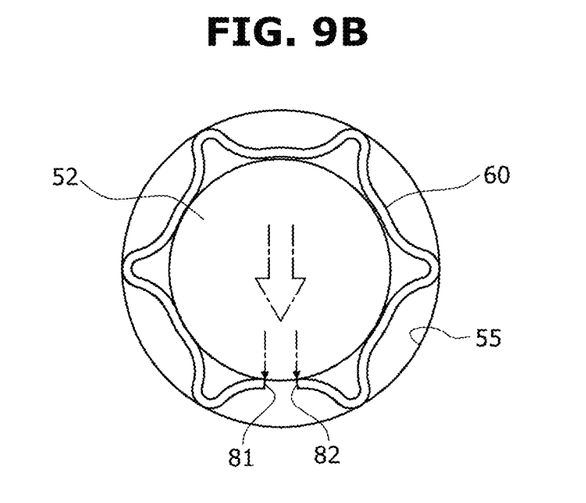

FIGS. 9A and 9B are a view schematically illustrating two ends of the elastic relaxation part and the movement of the elastic relaxation part based on a load direction according to an embodiment of the present disclosure. Referring to FIGS. 9A and 9B, when both ends of the elastic relaxation part 60 are disposed in the 6 o'clock direction and the load on the carrier pin 52 is in the 12 o'clock direction, the elastic relaxation part 60 may be deformed such that the first end 81 and the second end 82 may be brought close to each other. When both ends of the elastic relaxation part 60 are disposed in the 6 o'clock direction and the load on the carrier pin 52 is also in the 6 o'clock direction, the elastic relaxation part 60 may be deformed such that the first end 81 and the second end 82 may be deformed in the 6 o'clock direction.

The following is the description of an operation of the steering force actuator according to an embodiment of the present disclosure having the configuration described above.

The carrier pins 52 penetrate a plurality of the carrier holes 55 formed on the carrier body 51, respectively, and the elastic relaxation part 60 is inserted between the carrier hole 55 and the carrier pin 52 to provide preload. The sun gear 30 is disposed between the carrier pins 52, and the planetary gear 53 is mounted on the penetrating carrier pins 52 and then fixed by using the carrier fixer 54.

When the motor 20 is mounted in the housing 10, and then the motor 20 and the sun gear 30 are connected, the planetary gear 53 meshes with the sun gear 30 and the ring gear 40.

In addition, both ends of the elastic relaxation part 60 are spaced apart from each other such that the first end 81 and the second end 82 move based on a direction of a load to distribute the load. As a result, an elastic section become longer than in a case where the both ends are not spaced apart from each other and form a closed curve, thereby suppressing the occurrence of plastic deformation.

As the elastic modulus varies depending on the location in the both ends, spaced apart from each other, of the elastic relaxation part 60, an appropriate assembly location is required. As a radial gear force is smaller compared to a tangential gear force, the assembly location of the elastic relaxation part 60 should be at a portion where the elastic modulus of the elastic relaxation part 60 is lower.

In a planetary gear, meshing occurs at the following two points: a point between the planetary gear 53 and the sun gear 30, and a point between the planetary gear 53 and the ring gear 40. For example, if the initial assembly condition of the elastic relaxation part 60 results in (−) backlash at any one of the two points, a force corresponding to the magnitude of the (−) backlash acts on the elastic relaxation part 60. In this case, (+) backlash is formed at the other point of the two points. The elastic relaxation part 60 functions to move the planetary gear 53 from a point where the (−) backlash is formed to the other point where the (+) backlash is formed, thereby preventing gear jamming caused by the (−) backlash while maintaining minimum backlash. In addition, in a conventional planetary gear under operating conditions, the sum of radial forces is zero, and thus backlash from the initial assembly condition is maintained. In addition, for a compound planetary gear, in which the sum of radial forces is not zero, radial forces act in a direction of a sun gear and thus the minimum backlash condition may always be satisfied.

In the conventional planetary gear, manufacturing errors such as tooth thickness variations, gear precision errors, deviations in the distance between shafts, and continuous meshing between the sun gear and a plurality of planet gears prevent the load transmitted from an input shaft from being evenly transmitted to the plurality of planet gears. As a result, a gear transmission error increases, making the conventional planetary gear susceptible to noise and vibration. However, in the present disclosure, when the elastic relaxation part 60 inserted into the carrier hole 55 elastically supports the carrier pin 52, the self-location adjustment of the carrier pin 52 enables the load to be evenly transmitted to the plurality of the planetary gears 53, thereby reducing the gear transmission error.

In the steering force actuator 1 according to an embodiment of the present disclosure, the elastic relaxation part 60 applied to the carrier 50 is preloaded to elastically support the carrier pin 52 provided in the carrier 50, thereby maintaining minimum backlash, suppressing the occurrence of gear jamming, and enabling even load transmission to the planetary gear 53. As a result, the occurrence of noise and vibration may be mitigated.

Although the present disclosure has been described with reference to the embodiments illustrated in the drawings, the embodiments are for illustrative purposes only, and those skilled in the art will appreciate that various modifications and other equivalent embodiments are possible from the embodiments. Thus, the true technical scope of the present disclosure should be defined by the following claims

What is claimed is:

1. A steering force actuator apparatus comprising:
a housing;
a motor mounted in the housing and configured to provide a rotational force;
a sun gear rotating by the motor;
a ring gear mounted in the housing and disposed to surround the sun gear;
a carrier rotating by meshing between the sun gear and the ring gear, wherein a steering shaft interlocked with a steering wheel is mounted on the carrier, wherein the carrier includes a carrier body connected to the steering shaft and a carrier pin penetrating the carrier body and supported on an elastic relaxation part; and
the elastic relaxation part mounted on the carrier pin to reduce backlash; and
a rotation limiting part disposed on the carrier body and contacting with the elastic relaxation part to limit axial rotation of the elastic relaxation part.

2. The steering force actuator apparatus of claim 1, wherein the sun gear includes:
a sun shaft connected to the motor and rotating by being disposed coaxially with the steering shaft; and
sun teeth formed on the sun shaft and meshing with the carrier.

3. The steering force actuator apparatus of claim 1, wherein the carrier includes:
the carrier body connected to the steering shaft;
a plurality of carrier pins penetrating the carrier body and supported on the elastic relaxation part;
a planetary gear rotatably mounted on the respective carrier pin and configured to cause rotation of the carrier body by meshing with the sun gear and the ring gear; and
a carrier fixer configured to fix the planetary gear to the carrier body.

4. The steering force actuator apparatus of claim 3, wherein a carrier hole is formed on the carrier body so that the respective carrier pin penetrates the carrier body through the carrier hole, and
wherein the elastic relaxation part inserted into the carrier hole elastically supports the respective carrier pin.

5. The steering force actuator apparatus of claim 4, further including the rotation limiting part,
wherein at least one of the carrier hole and the respective carrier pin is provided with the rotation limiting part configured to limit axial rotation of the elastic relaxation part.

6. The steering force actuator apparatus of claim 4, wherein the elastic relaxation part includes:
a first elastic portion contacting with an inner peripheral surface of the carrier hole;
a second elastic portion contacting with an outer peripheral surface of the respective carrier pin; and
a third elastic portion connecting the first elastic portion and the second elastic portion,
wherein the first elastic portion and the second elastic portion are alternately disposed in a circumferential direction of the respective carrier pin.

7. The steering force actuator apparatus of claim 6, further including the rotation limiting part contacting with the first elastic portion to limit the axial rotation of the elastic relaxation part.

8. The steering force actuator apparatus of claim 6, wherein first and second ends of the elastic relaxation part are spaced apart from each other.

9. The steering force actuator apparatus of claim 8, wherein the first and second ends of the elastic relaxation part are disposed to contact with the inner peripheral surface of the carrier hole or the outer peripheral surface of the respective carrier pin and face each other.

10. The steering force actuator apparatus of claim 8,
wherein the elastic relaxation part further includes a fourth elastic portion connecting the first and second ends of the elastic relaxation part, and
wherein the fourth elastic portion is contracted by an external force and restored in response that the external force is removed.

11. The steering force actuator apparatus of claim 8, wherein the first and second ends of the elastic relaxation part correspond to a direction of a load applied to the respective carrier pin.

12. The steering force actuator apparatus of claim 3, wherein the planetary gear includes a first gear meshing with the sun teeth, and a second gear having a larger diameter than the first gear and meshing with the ring gear.

13. The steering force actuator apparatus of claim 3, wherein the carrier fixer includes a fixing elastic washer penetrated by the respective carrier pin, having a shape with a wave-like curved cross-section, and elastically pressurizing the planetary gear toward the carrier body.

\* \* \* \* \*